US007966219B1

(12) United States Patent
Singh et al.

(10) Patent No.: US 7,966,219 B1
(45) Date of Patent: Jun. 21, 2011

(54) SYSTEM AND METHOD FOR INTEGRATED RECOMMENDATIONS

(75) Inventors: James Singh, Austin, TX (US); Neil C. Thier, Austin, TX (US); Chris Hyams, Austin, TX (US); Thomas W. Wilbur, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 1791 days.

(21) Appl. No.: 10/950,354

(22) Filed: Sep. 24, 2004

(51) Int. Cl.
*G06Q 30/00* (2006.01)

(52) U.S. Cl. .......................................................... 705/26

(58) Field of Classification Search .................. 705/26, 705/27, 14
See application file for complete search history.

(56) References Cited

U.S. PATENT DOCUMENTS

| 5,765,143 | A | 6/1998 | Sheldon et al. ................. 705/28 |
| 6,266,649 | B1 | 7/2001 | Linden et al. |
| 6,393,479 | B1 | 5/2002 | Glommen et al. ............ 709/224 |
| 6,470,324 | B1 | 10/2002 | Brown et al. ................... 705/28 |
| 6,711,550 | B1 | 3/2004 | Lewis et al. ..................... 705/10 |
| 7,107,227 | B1 | 9/2006 | Bezos et al. |
| 7,113,917 | B2 | 9/2006 | Jacobi et al. |
| 7,433,879 | B1 | 10/2008 | Sharma et al. |
| 7,698,170 | B1 | 4/2010 | Darr et al. |
| 7,720,720 | B1 | 5/2010 | Sharma et al. |
| 7,720,723 | B2 | 5/2010 | Dicker et al. |
| 2001/0051893 | A1 | 12/2001 | Hanai et al. |
| 2002/0156699 | A1 | 10/2002 | Gray et al. |
| 2003/0009456 | A1 | 1/2003 | Shintani et al. ................... 707/6 |
| 2003/0023591 | A1 | 1/2003 | Ma et al. ............................ 707/6 |
| 2003/0135411 | A1 | 7/2003 | Ushiki et al. ................... 705/14 |
| 2003/0217055 | A1 | 11/2003 | Lee et al. ........................... 707/6 |
| 2003/0236785 | A1 | 12/2003 | Shintani et al. ................... 707/6 |
| 2003/0236883 | A1 | 12/2003 | Takeshima et al. ............ 709/225 |
| 2004/0049504 | A1 | 3/2004 | Hellerstein et al. ............... 707/5 |
| 2004/0059626 | A1* | 3/2004 | Smallwood ..................... 705/10 |

FOREIGN PATENT DOCUMENTS

WO    WO 2001029726 A2    4/2001

OTHER PUBLICATIONS

Marcelene Edwards, The News Tribune. Tacoma, Wash.: Jun. 27, 2001. p. D.1 http://proquest.umi.com/pqdweb?did=74784443&sid=2&Fmt=3&clientId=19649&RQT=309&VName=PQD.*
R. Agrawal et al., "Mining Association Rules Between Sets of Items in Large Databases," Proceedings of ACM SIGMOD Int'l Conference on Management of Data, pp. 207-216 (1993).

(Continued)

*Primary Examiner* — Mila Airapetian
(74) *Attorney, Agent, or Firm* — Hamilton & Terrile, LLP; Michael Rocco Cannatti (57) ABSTRACT

A recommendation appliance, system and method are provided for generating and deploying additional web page content or functionality (e.g., retail recommendations) to an existing web page server system. For example, the present invention may be embodied as a reverse proxy server that is inserted as an intermediate network node between a web server and the end users accessing the web server. In this position, the recommendation appliance can introduce recommendation messages to web pages generated by the web server without requiring any modification to the code or architecture of the web server. In addition, the appliance may separately track the transaction activities of end users who receive recommendation messages and the transaction activities of end users who do not receive recommendation messages, so that a comparison of the effectiveness of the recommendations may efficiently be demonstrated without requiring any modification to the code or architecture of the web server.

23 Claims, 6 Drawing Sheets

OTHER PUBLICATIONS

J. Han et al., "Mining Frequent Patterns Without Candidate Generation," Proceedings of ACM SIGMOD Int'l Conference on Management of Data, pp. 1-12 (2000).

J. Han, et al., "Mining Frequent Patterns Without Candidate Generation," ftp://ftp.fas.sfu.ca/pub/cs/han/slides/almaden00/ppt.

U.S. Appl. No. 10/099,404, filed Mar. 15, 2002, Darr et al.

B. Goethals, "Survey on Frequent Pattern Mining," HIIT Basic Research Unit, Department of Computer Science, University of Helsinki, Finland (2003).

"Association Rule Mining," COMP 290-90 Seminar, University of North Carolina at Chapel Hill, Fall 2003, http://www.cs.unc.edu/Courses/comp290-90-f03/associationrule1.pdf.

X. Shang, et al., "SQL Based Frequent Pattern Mining Without Candidate Generation" (Poster Abstract) ACM Symposium of Applied Computing, pp. 618-619 (Mar. 2004).

X. Shang, et al., "SQL Based Frequent Pattern Mining With FP-Growth," Proc. 15th Int. Conference on Applications of Declarative Programming and Knowledge Management, Berlin, Germany, 2004, http://wwwiti.cs.uni-magdeburg.de/~geist/publications/inap2004.pdf.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec1.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec2.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec3.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec4.ppt.

"Internet Content Adaptation Protocol (ICAP)" Network Appliance Version 1.01 (Jul. 30, 2001), pp. 1-13.

"Internet Content Adaptation Protocol (ICAP)" Informational Memo, Elson & Cerpa (Apr. 2003), pp. 1-49.

D. Franke, U.S. Appl. No. 10/912,699, filed Aug. 5, 2004, entitled System and Method for Efficiently Generating Association Rules.

* cited by examiner

SYSTEM AND METHOD FOR INTEGRATED RECOMMENDATIONS

BACKGROUND OF THE INVENTION

1. Field of the Invention

The present invention relates in general to computer network communications. In one aspect, the present invention relates to an apparatus, system and method for selectively deploying web page content.

2. Description of the Related Art

Figure 1:
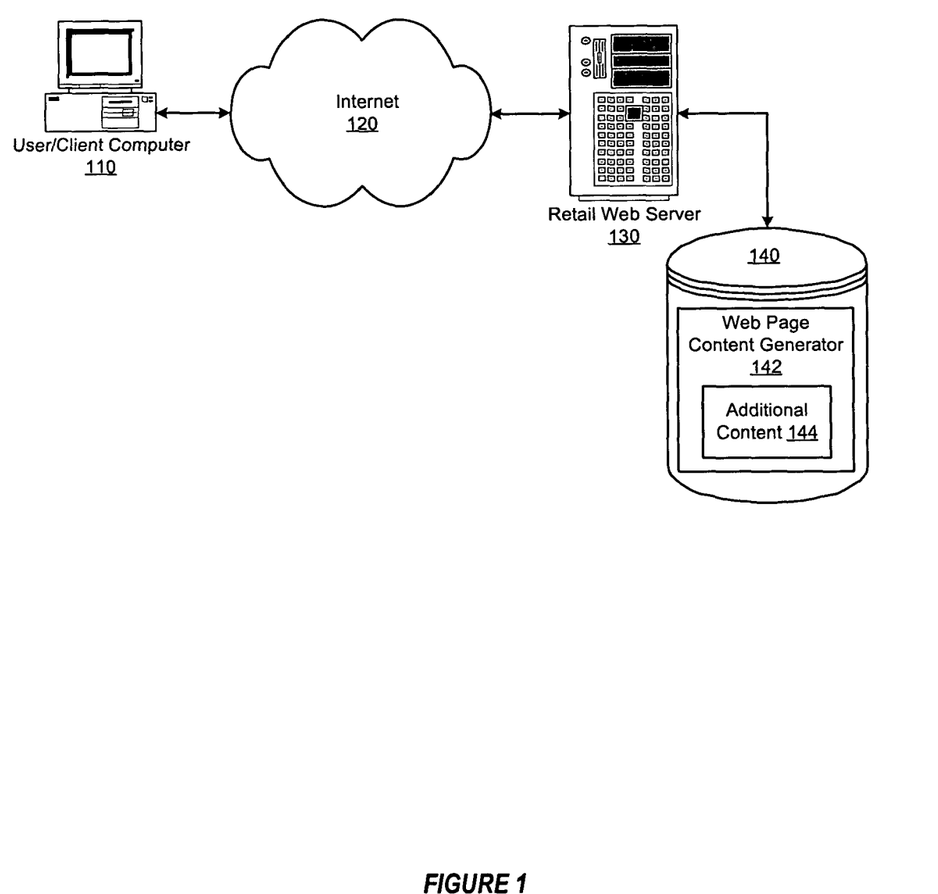
FIG. 1 illustrates a block diagram of a computer network, such as the Internet, over which web page requests by a user are conventionally serviced and returned from a web server.

The largest and best-known computer network in the world is the Internet which includes millions of computers that are used for commercial, academic, entertainment and government endeavors. With the advent of graphics-based Web browsers (such as Mosaic, Netscape Navigator, and Internet Explorer), the World Wide Web enabled users to access the exponentially growing content provided on the Internet. FIG. 1 illustrates a conventional example of a communication session over the Internet whereby a user at a client computer 110 sends a request for a web page over the Internet 120 that is serviced and returned from a web server 130. When a user 110 begins a communication session over the Internet 120, the user can request data files from an Internet-connected computer called a file server or website server 130. The website server 130 accesses a web page content generator program 142 (shown illustratively as being stored in a database or memory 140) that provides data files, typically in website page format, that are requested by the user. The web pages are typically written in a type of programming code called Hypertext Mark-up Language (HTML) or Extensible Markup Language (XML), and can be viewed or displayed through a browser containing a graphical user interface (GUI) program.

The design, assembly, creation and distribution of web page content 142 or other Internet-based functionality at the web server site 130 can be a complex and expensive undertaking, requiring significant time and expense to assemble a fully functional experience at the server 130. If it is ever necessary or desired that the web page content 142 or other Internet-based functionality at the web server site 130 be enhanced, modified, extended or otherwise altered, the code or architecture at the server 130 must be modified to include the additional content 144 as an alteration to the code or architecture at the server 130. This process is often time-consuming and expensive.

The difficulty of making changes to the code or architecture at the web server 130 also makes it difficult to demonstrate or test new features or functionality for the server 130. For example, the customer who owns a web server 130 may be reluctant to investigate or test new web page features for the web site 130 where the cost, time, risk and effort required to modify the code at the server 130 are significant in comparison to the perceived advantages of the new web page features. An additional challenge is the cost, time, risk and effort required to remove the new feature from the code on the server 130 if the feature demonstration or test is not successful.

To demonstrate the challenges presented by modifying a web site to include additional content 144, consider the example of adding recommendation content or functionality to a retail website hosted at server 130. In this example, the retail website server 130 was initially designed to include a web page content generator 142 which receives order information from the user/client computer 110 and assembles a web page which lists the purchased items contained in a cart for the user. If it is desired to add a purchase recommendation function to the web server 130, this additional functionality can be difficult to add because of the complexity of the required programming and data processing requirements. In particular, now that modern computers can assemble, record and analyze enormous amounts of data, historical transaction data can be collected and analyzed using data mining techniques to generate purchase recommendations for the user to consider based on discovering association relationships in a database by identifying frequently occurring patterns in the database. These association relationships or rules may be applied to extract useful information from large databases in a variety of fields, including selective marketing, market analysis and management applications (such as target marketing, customer relation management, market basket analysis, cross selling, market segmentation), risk analysis and management applications (such as forecasting, customer retention, improved underwriting, quality control, competitive analysis), fraud detection and management applications and other applications (such as text mining (news group, email, documents), stream data mining, web mining, DNA data analysis, etc.). Association rules have been applied to model and emulate consumer purchasing activities by describing how often items are purchased together. Typically, a rule consists of two conditions (e.g., antecedent and consequent) and is denoted as $A \_ C$ where A is the antecedent and C is the consequent. For example, an association rule, "laptop$\_$ speaker (80%)," states that four out of five customers that bought a laptop computer also bought speakers.

The difficulty of making recommendations increases as the number and complexity of mined association rules increases, which in turn is caused by an increase in the number of services and/or products, where each service or product may itself comprise a number of constituent services and products. The complexity of recommending a suitable configuration grows further with the number of constituent parts, the external needs of the customer, and the internal needs of the parts when considered as a whole. As will be appreciated, the code required to implement such a recommendation functionality can also be extremely complex so that there can be substantial time and expense required to add such functionality to the web server 130 as additional content 144.

As seen from the conventional approaches, a need exists for methods and/or apparatuses for improving the deployment of web page enhancements that can be quickly and easily integrated with existing web page server systems. There is also a need for improved use, deployment, demonstration and/or testing of data mining techniques to generate purchase recommendations for the end user while minimizing the need to change the coding or architecture at the web server site. There is also a need to seamlessly generate highly granular frequent sets and recommendations for use in an existing web server system without requiring coding changes at the web server. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for generating and deploying additional web page content or functionality (e.g., retail recommendations) to an existing web page server system. For example, the present invention may be embodied as a recommendation appliance for introducing recommendation messages in a web page server system. The appliance may include a port for communicating with an end user machine that uses a web browser to issue web page requests and to display requested web pages. As will be appreciated, any type of port, including any communication connection methodology using wired or wireless techniques, can be used to communicate with the end user machine(s) and any web server machine(s). The appliance may also include a port for communicating with a web server machine that generates requested web page content in response to a webpage request from the end user machine. The functionality of the appliance is implemented with a processing device and a memory that stores instructions and data which cause the appliance to modify a received web page, such as by inserting recommendation content or functionality into a requested web page before it is forwarded to the end user machine. When a web page request is received from an end user machine, the appliance forwards the request through a port to a web server machine identified in the web page request. In addition, the appliance uses data received from the end user machine (e.g., recommendation context information associated with the end user) to generate additional content or instructions for display to the end user (e.g., creating a purchase recommendation message) or to specify some other modification to be made to the requested web page. As a result, when the requested web page having original web page content is received at the appliance from the server machine, the appliance modifies the original web page content (e.g., inserts the purchase recommendation message or otherwise deletes, inserts or modifies all or part of the original web page content in real time), thereby generating a modified web page, and then returns the modified web page through the first port to the first end user machine. Thus, the modified web page may include content that is static, passively interactive or interactive, in which case the appliance is configured and programmed to respond to any response from the end user machine in response to the interactive content that was not included in the original web page content.

The appliance may also include instruction-based functionality for separating a plurality of end user machines or web page requests into two or more groups, where the first group is to receive modified web pages and the second group is to receive requested web pages that are not modified. The appliance may then separately record transaction activities (e.g., purchase activity) of the first and second groups, so that the transaction activities may be compared to demonstrate the effectiveness of the web page modification.

As will be appreciated, the appliance can be implemented as a reverse proxy server that is operatively coupled in a variety of ways as an intermediate node in a web server system, such as by using a first port to couple the appliance to a load balancing server or other network node and using a second port to couple the appliance to a web server, to a load balancing server (which in turn is operatively coupled to a plurality of web servers), or to another network node.

The objects, advantages and other novel features of the present invention will be apparent from the following detailed description when read in conjunction with the appended claims and attached drawings.

DETAILED DESCRIPTION

An improved method and apparatus are described for generating and deploying additional, altered or enhanced web page content or functionality (e.g., attribute-based retail recommendations) to an existing web page server system. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the computer network communications and data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 2:
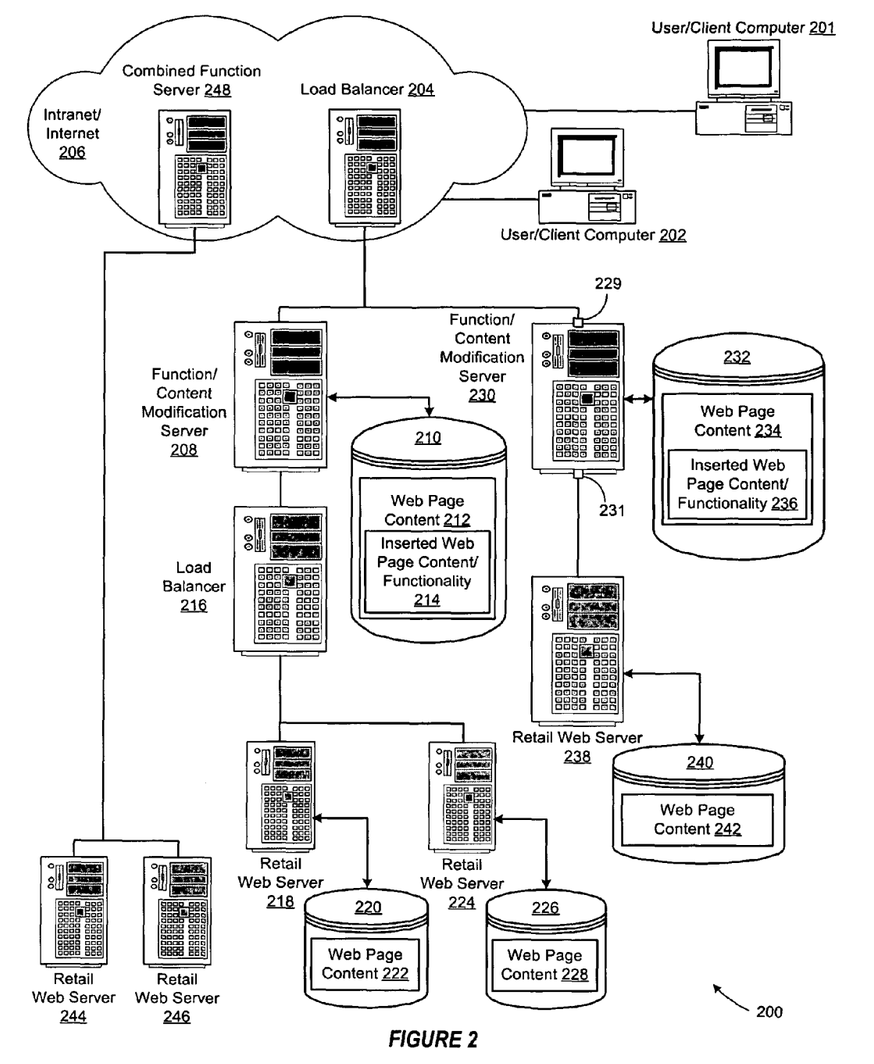
FIG. 2 illustrates various exemplary embodiments of a web page content deployment system and methodology whereby web page content and/or functionality is inserted in a requested web page.

Referring now to FIG. 2, a block diagram illustrates various exemplary embodiments of a web page content deployment system and methodology whereby web page content and/or functionality is inserted in a requested web page. In a selected application, the deployment system 200 may be used in combination with a pre-existing web page system that includes a retail web server (e.g., 238) that uses a network (e.g., Internet 206) to deliver web page content (such as a user interface) to a user computer (such as a client computer 202). In addition to web-based systems, various embodiments of the present invention may be used to deploy content and/or functionality with other computer network communication systems, such as any system where the user interface is delivered to the user without requiring processing at the user computer, such as IBM 3270 "green screen" applications, text based applications accessed via telnet, cell phones, mobile phones, PDAs and the like.

In the example of FIG. 2, a user interface or web page requested by the user computer 202 from the retail web server 238 may be seamlessly enhanced or modified by inserting or including a function/content modification server 230 between the user 202 and retail web server 238. Instead of directing the user's web page request directly to the retail web server 238, the Internet 206 (e.g., a load balancer 204) may be configured to direct a web page request from the end user 202 to a first port 229 of the content modification server 230 which processes data from the web page request while (or after) forwarding the web page request through a second port 231 for servicing by the retail web server 238. Of course a single port can be used to receive, forward, and retrieve data in the content modification server 230, or additional ports can be used. The web page request from the user 202 will contain data and/or will contribute to historical data for the user 202 that may be processed by the content modification server 230 to determine if any additional content or functionality is to be included in the web page returned to the user. If the content modification server determines that additional content or functionality is to be included, then the content modification server 230 receives the web page content returned from the retail web server 238 and inserts the additional content or functionality into the returned web page content before forwarding the modified returned web page to the user 202. This is illustrated in FIG. 2, where, in response to a web page request by the user 202, the retail web server 238 generates web page content 242 that is stored in memory 240 or is generated from a web page content generator program stored in memory 240. Based on the requested web page content 242 returned from the retail web server 238, the content modification server 230 generates modified web page content 234 by inserting additional or modified web page content and/or functionality 236. Again, the inserted web page content/functionality 236 may be stored in memory 232 or may be generated from a web page content generator program stored in memory 232.

As will be appreciated, other network arrangements may be used to modify a user interface that is generated by a remote server in response to a user request. FIG. 2 illustrates additional illustrative embodiments wherein one or more user computers 201, 202 access one or more local web servers or applications 218, 224 over a computer network (intranet or interne 206) using one or more load balancing servers 204, 216 and a function or content modification server 208. At the function/content modification server 208, a user interface (e.g., content 222 from server 218) may be modified or extended to insert additional content or functionality 214 before being forwarded to the end user (e.g., user 201) who views the modified/extended content 212 (e.g., with a web browser). By positioning the content modification servers between a first load balancer 204 and a second load balancer 216, web page requests from multiple users 201, 202 can be efficiently allocated to multiple retail web servers 218, 224, and can be efficiently modified to generate modified web page content 212 with inserted content or functionality 214 based on the original web page content 222, 228 from the retail web servers 218, 224. Of course, additional or fewer load balancing servers can be included as necessary, such as when a single content modification server 230 is assigned to each retail web server 238, or when a single content modification server 208 is connected to multiple retail web servers 218, 224 through one or more load balancers 216. In addition, the input load balancer 204 could be replaced with a server 248 having combined load balancing and content modification functions, in which case multiple retail web servers 244, 246 could be directly connected to the combined function server 248. Another network arrangement is to connect a plurality of content modification servers in series between the user computer(s) and the retail web server(s). For example, a first content modification server is connected to a second content modification server which is then connected to a retail web server. With such a series-connected network arrangement, a first content modification server, instead of sitting in front of a web content server, sits in front of a second content modification server, which in turn sits in front of a web content server. Thus, the first content modification server may be configured to add a purchase recommendation to the original web page response from the retail web server, while the second content modification server is configured to add a selling point message to the original web page response from the retail web server. Other content and/or function modification can be introduced with integrated, series-connected content modification servers, including user interface modification functions.

In whatever network arrangement is used, the content modification function may be advantageously implemented as a reverse proxy server to effectively change the content or functionality of the user interface from the server or application. For example, the reverse proxy server 230 may be used to add content 236 (such as instructions for the user) to the content 242 from the local web server or application (e.g., server 238) that is requested by one or more users 201, 202 over a computer network. This content change in the user experience can be implemented by the server 230 in a way that is seamless for the end user(s) and without requiring any change or modification to the code or architecture of the local web server 238.

In operation, the user (e.g., 202) requests a web page by pointing its web browser to the reverse proxy (e.g., 230), or alternatively a network administrator configures the computer network 206 to automatically direct the user 202 to the content modification server 230 instead of the local web server or application (e.g., server 238). The content modification server 230 receives the request for the application from the user 202 and fetches the requested web page URL from the retail web server 238 identified in the web page request. However, before the content 242 from the retail web server 238 is returned to the user 202, the content modification server 230 determines whether any additional content or functionality is to be added to the requested application. For example, the content modification server may analyze data contained in the request from the user 202, or may analyze historical data associated with the user 202, or may analyze the web page content returned from the retail web server 238. Various examples of such data analysis are described in connection with the generation of purchase recommendations based on attribute-based association rules, such as described in the U.S. patent application Ser. No. 10/870,360 (entitled "Attribute Based Association Rule Mining" and filed Jun. 17, 2004), U.S. patent application Ser. No. 10/912,734 (entitled "System and Method for Generating Effective Recommendations" and filed Aug. 5, 2004), U.S. patent application Ser. No. 10/912,743 (entitled "Retail Recommendation Domain Model" and filed Aug. 5, 2004), and U.S. patent application Ser. No. 10/912,699 (entitled "System and Method for Efficiently Generating Association Rules" and filed Aug. 5, 2004), each of which is assigned to Trilogy Development Group and is hereby incorporated by reference in its entirety.

Thus, the result of the data analysis may be the generation of new content 236 recommending one or more products for purchase by the user 202 and the insertion of the new content 236 into the web page content 234 that is to be returned to the user 202.

If content modification is required, the content stream 242 from the retail web server 238 may be transformed at the content modification server 230 by deleting, inserting or modifying the content stream in real time before it is sent back to the user 202. In accordance with selected embodiments of the present invention, any new or modified content (referred to as instrumented content) 236 can be completely static, such as when additional textual information is inserted into the web page. In addition or in the alternative, the new or modified content 236 may include interactive content to provide interaction functionality allowed by HTML form elements. In addition or in the alternative, the new or modified content 236 may offer passive content interaction, such as sending a message back to the content modification server when a user moves a mouse icon over, out of or clicks on an HTML element.

As will be appreciated by persons of ordinary skill in the art, the ability of the content modification server 230 to transform the original web page content 242 will require that the content modification server be programmed to "understand" the design, structure, layout and other display-related requirements of the web page content 242 generated by the retail web server 238 and expected at the browser of the user 202. In this way, content modifications can be made without impairing the information contained in the original web page content 242. In addition, if interactive content 236 is added to the web page content 234 to be displayed to the user 202, the reverse proxy 230 may be configured to intercept this interaction which was not in the original application 242, and thus would not be understood by the retail web server 238. In a selected embodiment, the content modification server 230 takes responsibility for taking any action required as a result of receiving notice of the user's interaction with the application having such an interactive content.

Figure 3:
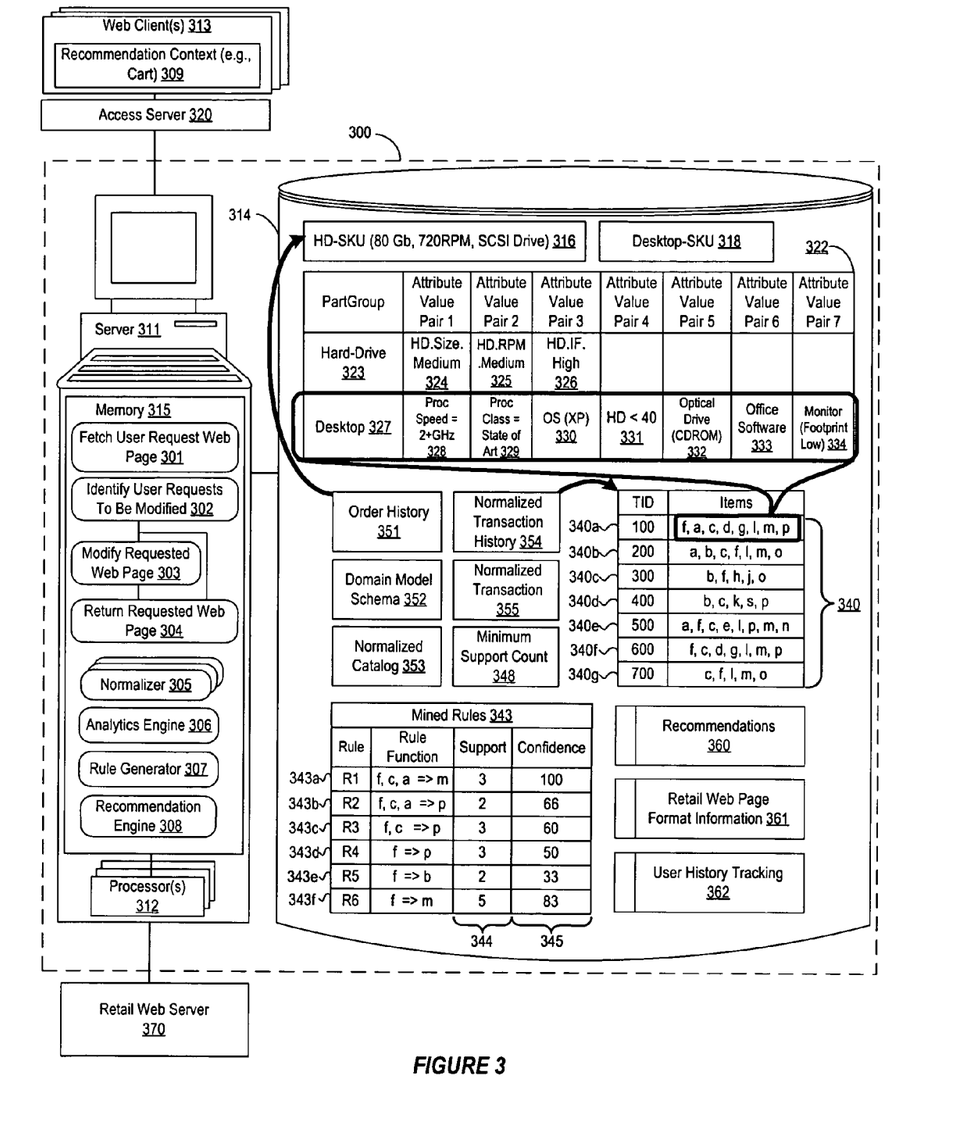
FIG. 3 illustrates an exemplary recommendation appliance apparatus for modifying requested web pages by generating recommendation(s) using an exemplary computer parts domain knowledge base and tracking the performance of the modified web pages.

Referring now to FIG. 3, a block diagram illustrates an exemplary recommendation appliance apparatus 300 for modifying requested web pages by generating relevant and specific recommendation(s) using an exemplary computer parts domain knowledge base. As depicted, the recommendations are inserted as additional content or functionality in the web pages returned to the web client machine(s) 313 by the retail web server machine 370. To generate the recommendation content, one or more input data sets of transaction information (e.g., order history information, catalog information, customer order-related information and/or other recommendation context data 309) are mapped or otherwise transformed into a second data set of transaction information (e.g., normalized transaction history, normalized catalog and/or normalized transaction data) that provides more detailed information specifying the attributes of the purchased or recommended product(s). In a selected application, the second data set of transaction information may be used to generate cross-sell and up-sell recommendations based on frequent patterns mined from an order history stored in a transaction database. By providing greater granularity to the transaction data, pattern correlation is improved by representing items in terms of their features so that a part or product may be represented in terms of its part group and various attribute-value pairs. For example, if there are three transactions involving the purchase of a computer with the third transaction also involving the purchase of DVD disks, by including an identification for each computer item of whether it includes a DVD drive (e.g., Computer.DVDrive.No for the first and second computers and Computer.DVDrive.Yes for the third computer), sufficient detail is provided to enable accurate correlation between the computer and disk purchases when generating association rules. By transforming the input data set(s) to a shared or normalized representation, a common domain model or representation of the various input data sets is provided that can be used to generate one or more recommendations along with an associated selling point message.

As depicted in FIG. 3, the recommendation appliance apparatus 300 is provided for generating web page modifications consisting of prioritized recommendations and associated selling messages using an exemplary computer parts domain knowledge base. The recommendation appliance apparatus 300 is implemented as a central server computer system 311 and a memory or database 314 that are connected in a communication system (e.g., a private wide area network (WAN) or the Internet) between one or more networked client or server computer systems 313 and one or more networked web servers 370. Communication between central server computer system 311 and the networked computer systems 313, 370 typically occurs over a network, such as a public switched telephone network over asynchronous digital subscriber line (ADSL) telephone lines or high-bandwidth trunks, for example, communications channels providing T1 or OC3 service. Networked client computer systems (e.g., 313) typically access central server computer system 311 through a service provider (such as an internet service provider) or an access server 320 (such as a load balancing server) by executing application specific software, commonly referred to as a browser, on the networked client computer systems 313. By implementing the recommendation appliance apparatus 300 as a reverse proxy server, the central server computer system 311 may be placed in the communication link between the client(s) 313 and retail web server 370 by making a simple address adjustment in the access server 320 and the retail web server 370.

In a selected example of how content modifications are generated, a first data set of transaction information is stored in a memory or database 314 that may be accessed directly or indirectly by the server 311. In this example, the first data set identifies the items included in one or more transactions (such as contained in the native order history 351) by including a generic product descriptor 316, 318 for each transaction item, such as the SKU for a purchased product. Thus, a hard drive that was purchased is identified with the hard drive SKU 316 and a desktop computer is identified with the desktop SKU 318. In addition or in the alternative, the first data set of transaction information identifies normalized catalog data 353, customer order-related information, product identifiers for items purchased by the end user and/or other recommendation context data 309 associated with the user at a web client 313.

A transformation or normalizer process 305 maps or otherwise transforms the first data set of transaction information into a second data set of transaction information that provides more detailed information identifying with greater specificity the attributes of the specified product(s). As indicated, if only one of the input data sets (e.g., the cart data 309) requires normalization, then a single normalizer process 305 is used, but if the order history data 351 or the native catalog data (not shown) requires normalization, then separate instances of the normalizer process 305 may be used. In a selected embodiment, the data transformation is implemented with a computer or other data processing functionality (e.g., server 311) which loads a copy of the first data set (e.g., 316, 318 from a database 314) into local memory (e.g., 315). As will be appreciated, the first data set may represent items from the customer cart 309, or may represent items from prior transactions in the order history database 351. Using a product detail knowledge database (such as contained in the domain model schema 352) and/or the normalized catalog database 353 that specify various product feature details for each transaction item, the server 311 invokes the normalizer process 305 to map or transform the generic product descriptors of the first data set (e.g., 316, 318) into a second data set (e.g., 354) that specifies additional details and/or features for the item of interest, such as more detailed product descriptor information. In the depicted embodiment, part numbers in an order (e.g., 316, 318) may be mapped to a part group identifier and to a set of attribute names and values (e.g., 323-326, 327-334, respectively) and stored in the database 314. For example, an 80 Gb, 7200 RPM, SCSI drive identified with the HD-SKU 316 could be mapped to the following numerical, attribute-based transaction items:

_Hard_Drive
_Hard_Drive._Size. 80 Gb
_Hard_Drive._RPM. 7200
_Hard_Drive._Interface.SCSI In accordance with the invention described herein, the transformation of the native cart or order history data may also use qualitative or time-variant attribute values to represent the normalized data. Such time-variant attribute values can be useful where the relevancy of recommendations, whether automatically or manually generated, can expire over time as new technologies appear or new products are offered. For example, a processor that was the highest performing in its class six months ago is no longer the highest performing in its class today. As a result, the recommendations generated six months ago may no longer be useful if the changes to the product offering and technology over time are not taken into account. Manual recommendation updates are burdensome in requiring, at one extreme, replacement of outdated recommendations with new, but similar, recommendations, and at the other extreme, modifying existing recommendations. To address this problem, the normalizer process 305 may also include a transformation process for adjusting the values of attributes in the normalized data sets 353, 354, 355 to account for the changing technologies and product offerings over time. Products that were "high performance" or products that were "state-of-the-art" at the time the recommendations were originally generated may be adjusted to "moderate performance" or "middle-of-the-road technology." For example, an 80 Gb, 7200 RPM, SCSI drive identified with the HD-SKU 316 could be mapped to the following qualitative, attribute-based transaction items:

_Hard_Drive
_Hard_Drive._Size. Medium
_Hard_Drive._RPM. Medium
_Hard_Drive._Interface.High These items are included in a second data set 322 as an entry 323-326 which quantifies the consumer preferences for one or more products and associated product features and which is organized or stored in a structured format, such as a database or table. In this example, the original item description 316 is now expanded and represented by a Part Group identifier 323 and three attribute items 324, 325, 326. In similar fashion, the original item description 318 for a desktop computer is expanded and represented by a Part Group identifier 327 and seven attribute items 328-334 (in this example) that are stored as an entry in the second data set 322. These additional attribute items 328-334 specify the processor speed 328, processor class 329, operating system type 330, hard drive size 331, optical drive type 332, software package type 333, and monitor type 334 for the desktop item.

Because of the additional product detail information contained in the second data set (e.g., normalized transaction history 354), it can be used in transaction database applications to provide more meaningful frequent pattern analysis that is performed by the analytics engine 306. A broad variety of efficient algorithms for mining association rules have been developed in recent years, including algorithms based on the level-wise Apriori framework, TreeProjection and FPGrowth techniques. For example, association rules may be generated from the expanded second data set of transaction information that is included as part of a transaction database 340 representing the normalized transaction history 354, as indicated with entries 340a-g in FIG. 3. An important consideration with data mining applications is the representation of the transaction database 340. Conceptually, such a database can be represented by a binary two-dimensional matrix in which every row (e.g., 340a) represents an individual transaction (with a transaction identifier (e.g., TID 100)) and the columns represent the items in the transaction (e.g., f, a, c, d, g, l, m, p). Such a matrix can be implemented in several ways. The most commonly used layout is the horizontal data layout. That is, each transaction has a transaction identifier and a list of items occurring in that transaction. Another commonly used layout is the vertical data layout, in which the database consists of a set of items, each followed by its cover.

In the example of FIG. 3, the server 311 begins the process of generating association rules 343 by retrieving the item descriptors from the normalized transaction database 340 and a minimum support count 348. The server 311 then identifies all items in the database 340 with a frequency meeting or exceeding the minimum support count requirement (e.g., the minimum support count is 3), and uses a rule generator 307 (depending on the rule generation algorithm used) to generate a plurality of association rules 343a-f. Each association rule may include a support and confidence metric that is calculated by the server 311. For example, the support metric 344 is determined by the number of times the rule is supported in the transaction database 340, and the confidence metrics 345 are determined by the percentage of times the antecedent of the rule leads to the consequent.

Once the association rules 343 are finalized (which may optionally include an optimization to remove redundant rules), the recommendation engine 308 is invoked to process the recommendation context information generated by the cart 309 to identify potentially matching association rules which are to be further processed for possible issuance as recommendations 360 to be inserted in the requested web page returned from the retail web server 370. To this end, a normalizer process 305 may be executed to generate a normalized representation of the recommendation context 309 based on the domain model schema 352 and/or normalized catalog 353, which may be stored as a normalized transaction data set 355. The normalized transaction representation 355 may be used by the recommendation engine 308 to identify association rules from the mined rules 343 that match the recommendation context 309. For example, the recommendation engine 308 may include a rule evaluation process for evaluating the mined rules 343 against the normalized transaction representation 355 (e.g., [f, c]) to generate a list of candidate rules whose trigger evaluated to true (e.g., R1, R2, R3) in response to the recommendation context 309. In addition, the recommendation engine 308 may exclude any matching rules that do not meet a minimum confidence requirement, leaving only high confidence rules in the candidate rule set. The above-referenced Trilogy patent applications incorporated herein by reference provide additional details concerning the process for generating association rules, for processing, prioritizing, scoring and filtering candidate recommendation rules, and for generating selling point messages to accompany the recommendation rules.

As a standalone or integrated server node, the recommendation appliance apparatus 300 depicted in FIG. 3 may also be used to track the performance of the modified web pages in terms of the end user activities taken in response to the content or functionality inserted in the web pages. In particular, when an end user at a web client (e.g., 313) requests a web page from the retail web server 370, the request is received at the server 311 which invokes a fetch routine 301 to forward the web page request to the web server 370. After the web page request is received, the server 311 may invoke an identification routine 302 to determine if the requested web page should be enhanced, modified, extended or otherwise altered before being returned to the web client 313. For example, the identification routine 302 may determine whether a recommendation message should be inserted in the requested web page by analyzing data contained in the request from the user 313, or by analyzing historical data associated with the user 313, or by analyzing the web page content returned from the retail web server 370. When it is determined that a requested web page is to be modified, a modification routine 303 is invoked to insert the additional content and/or functionality (e.g., a purchase recommendation 360) into the returned web page using any desired web page editing techniques. As will be appreciated, the ability to transform the original web page content will require that the modification routine 303, alone or in combination with customer web page format information 361, be programmed to "understand" the design, structure, layout and other display-related requirements of the web page content generated by the retail web server 370 and expected at the browser of the web client 313. The return routine 304 may be invoked to return the modified requested web page to the end user 313 in a real time basis.

As an additional useful demonstration feature, the identification routine 302 may be used to segregate web page requests in a predetermined fashion for purposes of demonstrating the effectiveness of the added content and/or functionality provided by the recommendation appliance apparatus 300. The segregated requests may then be tracked in the user history tracking database 362 to determine how the modified content affected the behavior of the end users. As but one example, a predetermined percentage of web clients submitting web page requests may be filtered or separated out from the remaining web clients by the identification routine 302 to receive purchase recommendations using any desired predetermined recommendation technique (such as time-based filtering, end user identification-based filtering, etc.). Other requests may receive recommendations using a different recommendation technique or may receive no recommendation at all. By assembling transaction purchase data for all the clients in the user history tracking database 362 and comparing the purchase behavior of clients that received recommendations with that of clients that did not receive recommendations (or that received different recommendations), the effectiveness of the recommendation engine or different recommendation techniques may be assessed. With this implementation of the recommendation appliance apparatus 300, the effectiveness of a content modification may be demonstrated without requiring any changes or revisions to the coding or architecture of the retail web server 370. In addition, if the content modification is demonstrated to be ineffective, the content modification may be easily removed by simply removing the recommendation appliance apparatus 300 and connecting the retail access server 320 directly to the retail web server 370, again without requiring any changes or revisions to the coding or architecture of the retail web server 370. Other useful selective modification examples include presenting a different user interface to the end user.

Figure 4:
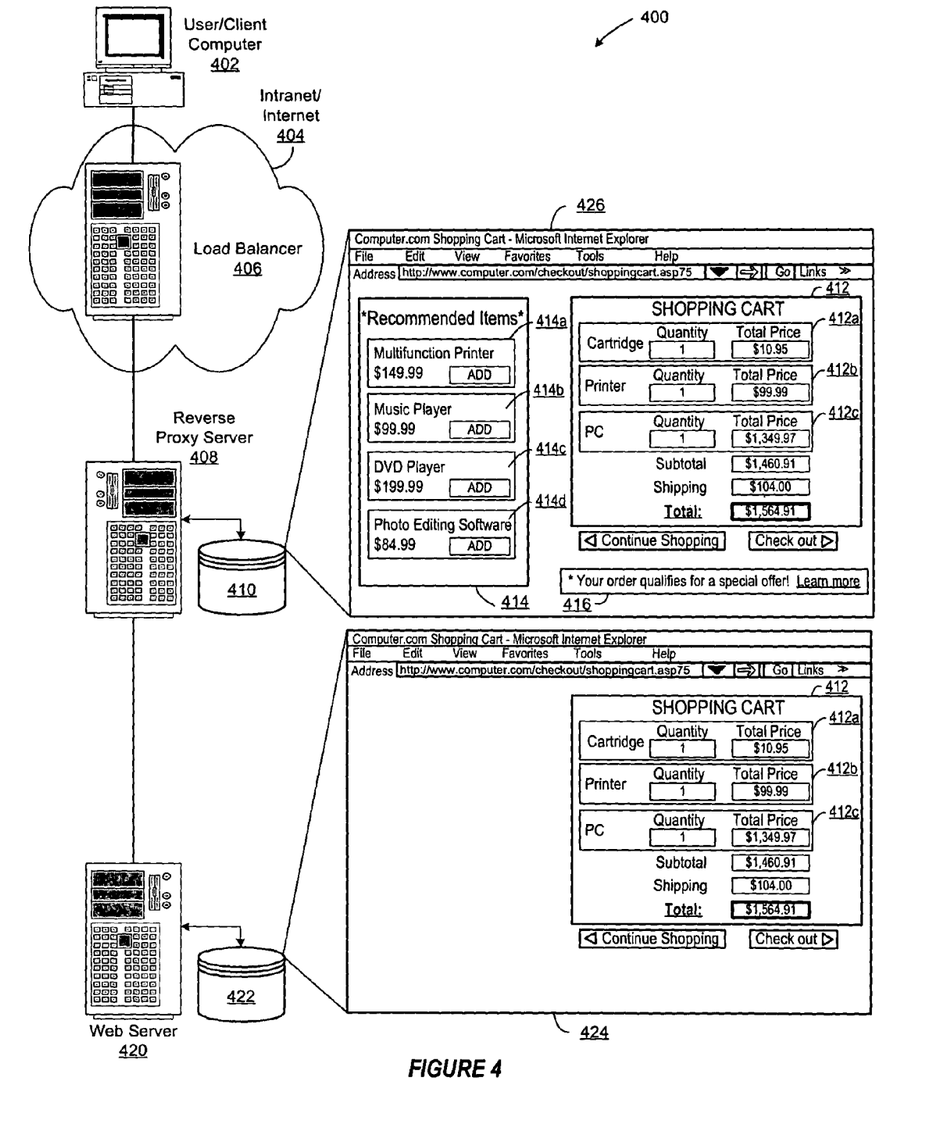
FIG. 4 illustrates an exemplary data processing system and network for inserting recommendation content and/or other functionality into a requested web page.

In accordance with selected embodiments of the present invention, an intermediate computing or network node is used to add content or functionality to a user interface or to otherwise enhance, modify, extend or alter the user interface as it is being returned to the requestor. While present invention may be used to modify the user interface in any desired manner, FIG. 4 illustrates an exemplary data processing system and network 400 for inserting recommendation content and/or other functionality into a requested web page. The data processing system and network 400 includes one or more end user computers (e.g., client machine 402) and at least one web server 420. The data processing system and network 400 also includes a reverse proxy server 408 in the communication path between the client machine 402 and the web server 420, as determined by the load balancer 406. The reverse proxy server 408 is an example of an intermediate computing node that provides additional content or functionality to the system in a way that is transparent to the client machine 402 and the web server 420.

In operation, a web page request from the client machine 402 is transmitted over a network (e.g., intranet/internet 404) and received by the reverse proxy server 408, where it is forwarded to the web server 420. Based on information contained in or associated with the web page request and/or in response to programming or data contained in memory or storage 422, the web server 420 generates a web page (e.g., web page 424) and sends the generated web page 424 back to the user computer 402. However, the reverse proxy server 408 that is located in the communication path between the client machine 402 and the web server 420 may modify the returned web page 424 to insert additional content and/or functionality, thereby producing a new or modified web page 426. In particular, simultaneously with or subsequent to forwarding of the web page request, the reverse proxy server 408 determines if the requested web page 424 should be enhanced, modified, extended or otherwise altered before being returned to the client machine 402. This determination can be made in a variety of ways, including, but not limited to, using a simple look-up table techniques, using association rule mining techniques to identify content or functionality that is associated with the web page request or the requested web page, or to otherwise correlate additional content or functionality with data contained in or associated with the web page request from the end user. In the example depicted in FIG. 4, the enhancements may include a list of recommended products 414a-d which correspond to the items 412a-c listed in the shopping cart 412. Other examples of content or functionality enhancements may also be provided by the reverse proxy server 408, including a customized message 416 to the end user, contextual help information that is relevant to the user's browsing activity and the like that is generated in response to the user's activity.

Figure 5:
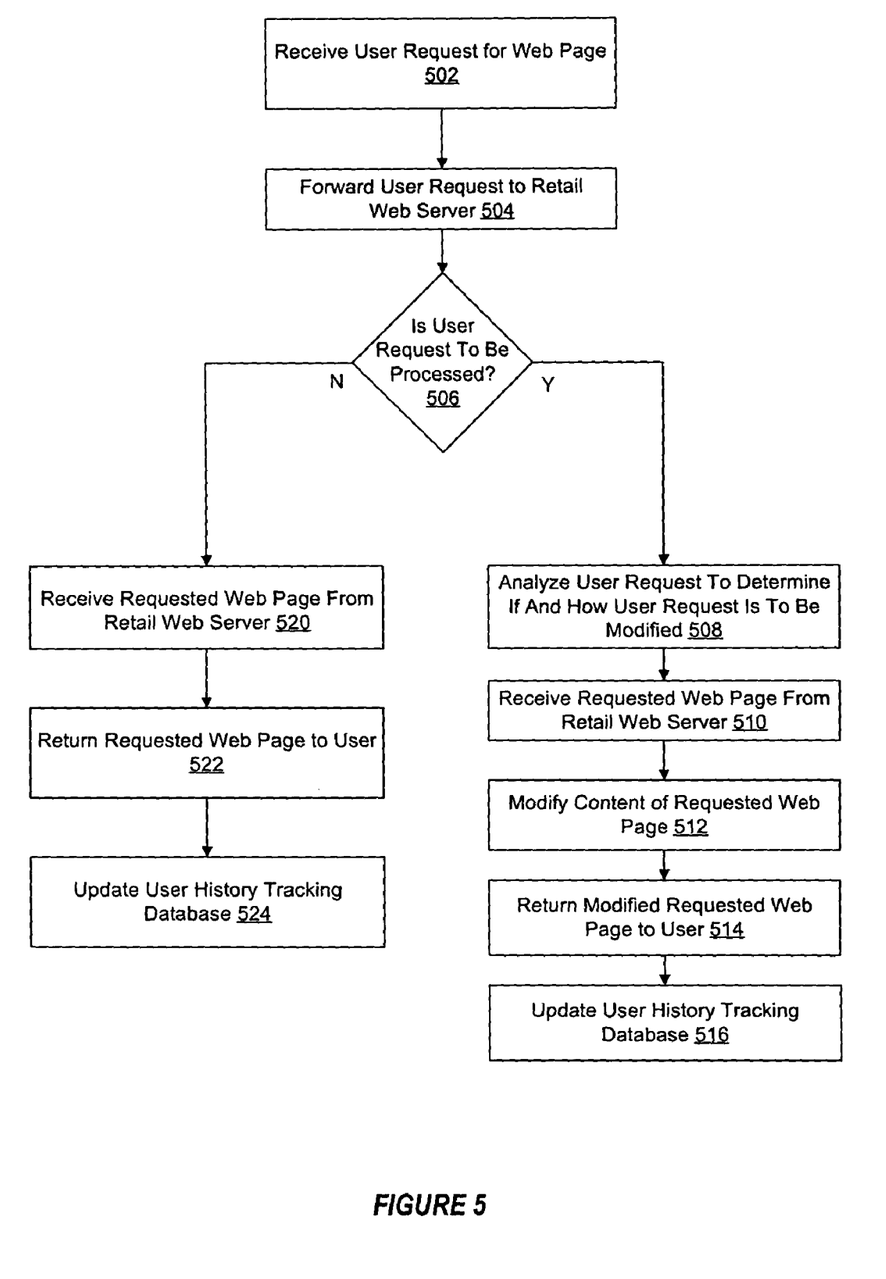
FIG. 5 shows a flowchart schematically illustrating the processing of web page requests to include inserted content and/or functionality at an intermediate network node before returning the requested web page to the user.

Turning now to FIG. 5, an exemplary flow methodology is illustrated for processing web page requests to include inserted content and/or functionality at an intermediate network node before returning the requested web page to the user. As will be appreciated, the methodology illustrated in FIG. 5 shows how to process, modify and track web page requests. It will be appreciated by those of ordinary skill in the art that the sequence of illustrated steps may be modified, reduced or augmented in keeping with the disclosure of the present invention. For example, all user requests may be processed (thereby eliminating steps 520, 522 and 524), or the user history tracking steps (524, 516) may optionally be included or excluded, or the user request analysis (step 508) may be performed after the requested web page is received at the intermediate network node from the retail web server. Thus, it will be appreciated that the methodology of the present invention may be thought of as performing the identified sequence of steps in the order depicted in FIG. 5, though the steps may also be performed in parallel, in a different order, or as independent operations that are combined to obtain a score for the candidate recommendation rule.

The description of the method can begin at step 502, where the intermediate network node receives the user request from the client machine or end user. In a selected embodiment, the intermediate node also receives or accesses recommendation context data from the end user that is associated with the user request. The mechanics of obtaining the recommendation context can be accomplished by a variety of ways, such as by retrieving quote information from the customer cart or by obtaining information from outside of a cart, such as from a simple product page, a configuration page, or even a user's click-path/browse-path/user session history.

At step 501, the user request is forwarded by the intermediate network node to the appropriate retail web server that is to service the user request. The forwarding step may be implemented with any desired network addressing techniques to deliver the user request to the web server location specified in the user request or specified by an intermediate addressing machine, such as a load balancing server.

At step 506, the intermediate network node determines if the user request is to be processed for purposes of adding content or functionality to the requested web page that has been requested by the user. This determination allows different user requests or end user activity to be treated differently, so that some requested web pages are not modified (steps 520, 522), while others are (steps 508, 510, 512, 514). The ability to differentiate the processing of user requests beneficially allows the intermediate network node to efficiently test and/or demonstrate the benefits or drawbacks of content or functionality modification provided by the intermediate network node.

For example, if the intermediate network node determines that a given user request is not to be processed (negative outcome from decision 506), then the intermediate network node simply receives the requested web page from the server (step 520), forwards or returns the requested web page to the end user without modifying its content or functionality (step 522), and optionally updates the user history tracking database to record this handling of the user request (step 524).

On the other hand, if the intermediate network node determines that a given user request is to be processed (affirmative outcome from decision 506), then the intermediate network node analyzes the user request and/or its associated recommendation context data to determine if and how the user requested web page is to be modified (step 508), receives the requested web page from the web server (step 510), and modifies the content or functionality of the requested web page (step 512) before returning the modified requested web page to the end user (step 514). In accordance with an illustrative embodiment, the intermediate network node uses the recommendation context data from the user request to select association rules that match the recommendation context, and these selected association rules are used as a candidate recommendation rule set that is scored, prioritized and filtered to identify one or more recommendation rules to be inserted in the requested web page before its return to the end user. Once the recommendation rules are identified, the intermediate network node inserts the recommendation rule text or functionality as web page content into the requested web page and then forwards the modified web page to the end user. When a requested web page is modified and returned to the end user, the intermediate network node may optionally update the user history tracking database to record this handling of the user request (step 516). With user history tracking data, the purchasing activity of end users may be measured and compared to determine or demonstrate the effectiveness of any particular web page modification undertaken at step 512.

Figure 6:
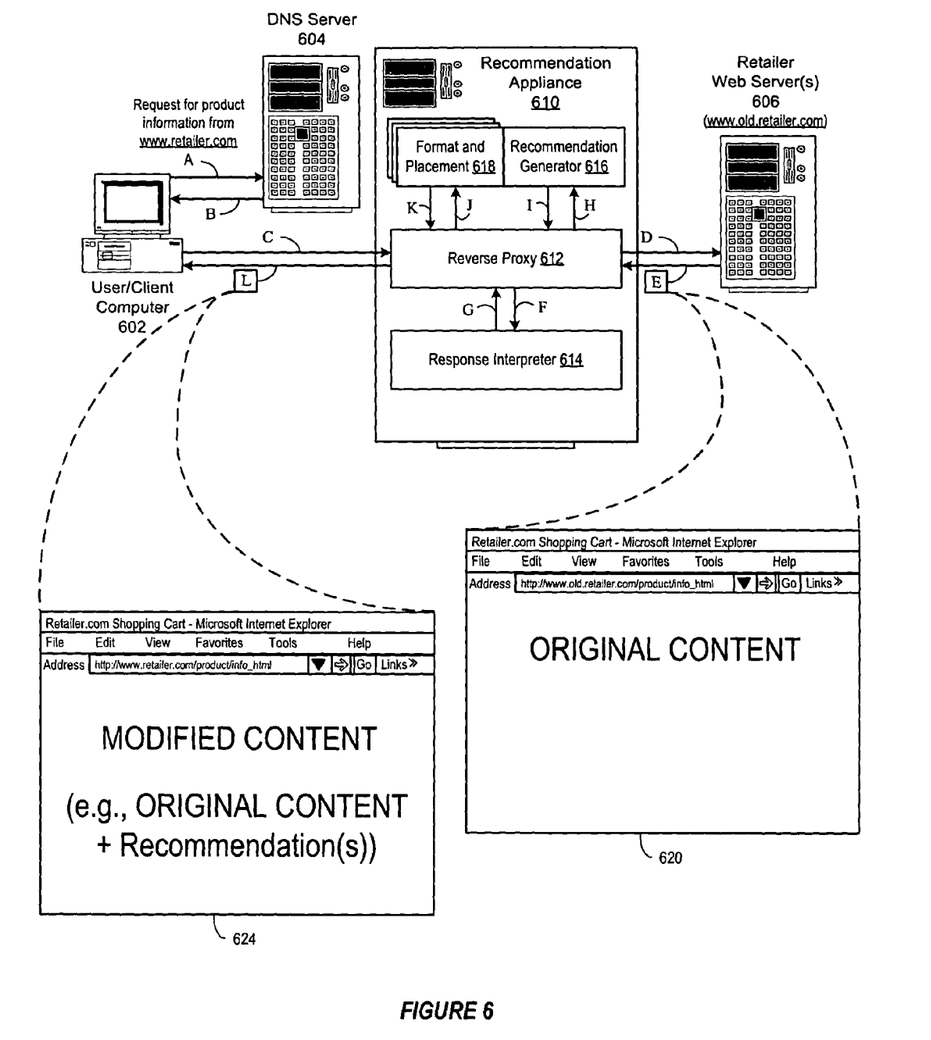
FIG. 6 illustrates a recommendation system, method and apparatus for generating and inserting modified content into a requested web page in accordance with an alternative embodiment of the present invention.

Persons skilled in the art will appreciate that a variety of implementation approaches may be used to modify web page content and functionality in accordance with the present invention. For example, FIG. 6 illustrates an alternative system, method and apparatus for generating and inserting modified content into a requested web page in accordance with an alternative embodiment of the present invention. As illustrated, a web browser on the client computer 602 is used to interact with a target website, such as a retailer's web server 606, using a computer network that includes, for example, a DNS Server 604 which is responsible for translating a domain name from a user request into a corresponding IP address. By implementing a recommendation appliance 610 as a reverse proxy server that is inserted between the user 602 and the target website (e.g., retailer web server 606), the user 602 that issues a web page request to the retailer web server 606 can have web page responses modified at the recommendation appliance 610 without the user 602 being able to detect that it is not interacting directly with the target website 606, and without modifying the code or architecture of the retailer web server 606. In a selected embodiment, this may be accomplished by providing a response interpreter 614 on the recommendation appliance 610 to extract data from the response generated by the retailer web server 606. The response interpreter 614 is synchronized with the recommendation generator 616 to extract data from the web page response(s) that the recommendation generator needs to insert dynamic content into the response from the target website 606. Of course, the response interpreter can be synchronized with any type of content modification functionality (and not just a recommendation generator) that examines the web page response, takes some action, and the inserts or revises the response based on that action.

The operational flow of the system, method and apparatus depicted in FIG. 6 may be understood with reference to a user that requests a web page (communication A) from a retailer (www.retailer.com) using a web browser on the client machine 602. At the DNS server 604, the DNS entry for www.retailer.com is configured to point to the IP address of the machine (or load balancer for) the recommendation appliance 610, instead of pointing directly to the IP address of the load balancer for the retailer web server(s) 606. For purposes of this illustration, the retailer web server 606 corresponds to a DNS entry of www.old.retailer.com. To route the web page request to the recommendation appliance 610, the DNS server 604 returns the updated IP address to the user 602 (communication B). The user's web browser may then connect to the recommendation appliance 610 to request the URL for the requested web page (communication C).

The reverse proxy module 612 in the recommendation appliance 610 translates the web page request of the form http://www.retailer.com/product/info.html to http://old.retailer.com/product/info.html, and makes a request to the new URL at the retailer web server 606 (communication D). All other information about the web page request from the user machine 602 (e.g., cookies and post data) is unchanged.

When the reverse proxy 612 receives the response from old.retailer.com (communication E), the response includes whatever original content was generated by the retailer web server 606 in response to the web page request. For example, a web page 620 may be generated that includes a listing of product information as the original content in responSe to the web page request seeking product information from the retailer web server 606.

The reverse proxy 612 forwards the original response from the retailer web server 606 to a response interpreter 614 (communication F) which extracts the information needed to determine if or how the original response is to be changed or modified. For example, the response interpreter 614 extracts the information or data from the original response that the recommendation generator 616 will expect. The extracted information or data is returned by the response interpreter 614 to the reverse proxy 612 (communication G), which then submits this information or data as a request to the recommendation generator module 616 (communication H). A response from the recommendation generator 616 (such as a listing of product purchase recommendations) is returned to the reverse proxy 612 (communication I). While the response from the recommendation generator 616 may already be formatted for inclusion in the requested web page, it may alternatively be separately submitted to a format and placement module 618 (communication J) for HTML formatting, with specific instructions about the placement position within the web page response 620 from the retailer web server 606 being returned to the reverse proxy 612 (communication K). The use of a separate format and placement module 618 allows customized formatting for each target retailer web site, as indicated by the depiction of multiple instances of the format and placement module 618 in FIG. 6. However the content modification is formatted, the fully formatted HTML response 624 may then be returned to the user (communication L), where the response 624 includes the modified content (such as the original listing of product information modified to include additional recommendations generated by the recommendation generator 616).

In an exemplary embodiment, the system and method for generating and deploying additional web page content or functionality (e.g., retail recommendations) to an existing web page server system may be implemented with a standalone data processing system (such as a recommendation appliance) that modifies the web page content returned to an end user (such as by processing transaction database information to provide attribute-based association rules that are scored and prioritized to generate purchase recommendations with associated selling point/message texts). Various examples of standalone data processing systems for generating purchase recommendations with associated selling point/message texts are described in U.S. patent application Ser. No. 10/912,734 (entitled "System and Method for Generating Effective Recommendations" and filed Aug. 5, 2004) and U.S. patent application Ser. No. 10/912,743 (entitled "Retail Recommendation Domain Model" and filed Aug. 5, 2004), each of which is assigned to Trilogy Development Group and is hereby incorporated by reference in its entirety. For example, data processing may be performed on computer system 300 which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 300 includes one or more microprocessor or central processing units (CPU) 312, mass storage memory 314 and local RAM memory 315. The processor 312, in one embodiment, is a 32-bit or 64-bit microprocessor manufactured by Motorola, such as the 680×0 processor or microprocessor manufactured by Intel, such as the 80×86, or Pentium processor, or IBM. However, any other suitable single or multiple microprocessors or microcomputers may be utilized. Computer programs and data are generally stored as instructions and data in mass storage 314 until loaded into main memory 315 for execution. Main memory 315 may be comprised of dynamic random access memory (DRAM). As will be appreciated by those skilled in the art, the CPU 312 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary skill in the art will recognize that the foregoing components and devices are used as examples for the sake of conceptual clarity and that various configuration modifications are common.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to improve the generation of attribute-based rules and purchase recommendations. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based data processing system described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a standalone computer system, or may be run from a server computer system that can be accessed by a plurality of client computer systems interconnected over an intranet network, or that is accessible to clients over the Internet. In addition, many embodiments of the present invention have application to a wide range of industries including the following: retail, enterprise and consumer electronics, general retailers, computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A recommendation appliance for introducing recommendation messages in a web page server system, comprising:
   a first port for communicating with at least one end user computer that comprises a web browser for issuing web page requests and displaying requested web pages;
   a second port for communicating with at least one web server computer that generates requested web page content in response to a web page request;
   at least one processing device; and
   a memory having stored thereon executable instructions and data which, when executed by the processing device, cause the recommendation appliance to:
     forward a web page request received from a first end user computer at the first port through the second port to a first web server computer identified in the web page request;
     receive at the second port a requested web page comprising original web page content from the first web server computer that is generated in response to the web page request from the first end user computer;
     generate at least one purchase recommendation based on a recommendation context that is extracted from the web page request or from the requested web page received from the first web server computer;
     modify the original web page content to include the purchase recommendation, thereby generating a modified web page; and
     return the modified web page through the first port to the first end user computer.

2. The recommendation appliance of claim 1, where the recommendation appliance comprises a reverse proxy server.

3. The recommendation appliance of claim 1, where the recommendation appliance comprises a reverse proxy server where the first port is operatively coupled to a load balancing server and the second port is operatively coupled to a web server.

4. The recommendation appliance of claim 1, where the recommendation appliance comprises a reverse proxy server where the first port is operatively coupled to a first load balancing server and the second port is operatively coupled to a second load balancing server which is operatively coupled to a plurality of web servers.

5. The recommendation appliance of claim 1, where the purchase recommendation is a set of instructions for display with the requested web page by the web browser at the first end user computer.

6. The recommendation appliance of claim 1, where the executable instructions and data which cause the recommendation appliance to modify the original web page content by deleting, inserting or modifying all or part of the original web page content in real time before being returned to the first end user computer.

7. The recommendation appliance of claim 1, where the purchase recommendation comprises static content.

8. The recommendation appliance of claim 1, where the purchase recommendation comprises interactive content.

9. The recommendation appliance of claim 8, further comprising executable instructions and data which cause the recommendation appliance to respond to any response from the first end user computer in response to the interactive content that was not included in the original web page content.

10. The recommendation appliance of claim 1, where the purchase recommendation comprises passive content.

11. The recommendation appliance of claim 1, further comprising executable instructions and data which cause the recommendation appliance to:
   separate a plurality of web page requests into at least a first group of web page requests and a second group of web page requests on a predetermined basis, where requested web pages generated by the first group of web page requests are modified to include a first purchase recommendation, and requested web pages generated by the second group of web page requests are modified to include a second purchase recommendation; and
   separately record transaction activities of the first group of web page requests and the second group of web page requests.

12. The recommendation appliance of claim 11, where the first purchase recommendation is based on a first recommendation technique and where the second purchase recommendation is based on a second recommendation technique.

13. The recommendation appliance of claim 1, further comprising executable instructions and data which cause the recommendation appliance to:
   separate a plurality of web page requests into at least a first group of web page requests and a second group of web page requests on a predetermined basis, where requested web pages generated by the first group of web page requests are modified to include a first purchase recommendation, and requested web pages generated by the second group of web page requests are not modified; and
   separately record transaction activities of the first group of web page requests and the second group of web page requests.

14. The recommendation appliance of claim 1, further comprising executable instructions and data which cause the recommendation appliance to:
   separate a plurality of web page requests into at least a first group of web page requests and a second group of web page requests on a predetermined basis, where the first group of web page requests is to receive modified web pages and the second group of web page requests is to receive requested web pages that are not modified; and
   separately record transaction activities of the first group of web page requests and the second group of web page requests.

15. The recommendation appliance of claim 1, where the first port comprises a wireless connection.

16. A computer-based method of generating recommendations at an integrated recommendation proxy server for potential purchase by a customer, comprising:
- receiving a web page request from an client computer;
- forwarding the web page request to a web server identified in the web page request;
- generating a purchase recommendation based on a recommendation context associated with the web page request while the web page request is forwarded to the web server;
- receiving a requested web page comprising original web page content from the web server that is generated in response to the web page request;
- modifying the original web page content to include the purchase recommendation, thereby generating a modified web page; and
- returning the modified web page to the client computer.

17. The method of generating recommendations of claim 16, where generating a purchase recommendation comprises selecting from among a plurality of association rules to identify a plurality of candidate recommendations having a trigger that matches the recommendation context associated with the web page request.

18. The method of generating recommendations of claim 16, further comprising modifying the web page request to adapt any part of the web page request that corresponds to previously modified functionality or content such that the web server identified in the web page request can interpret the web page request.

19. The method of generating recommendations of claim 16, further comprising modifying the web page request to adapt any part of the web page request that corresponds to a purchase recommendation included in a previously returned modified web page so that the web server identified in the web page request can interpret the web page request.

20. The method of generating recommendations of claim 16, where the recommendation context comprises order history information associated with a user who issued the web page request.

21. A system for generating purchase recommendations for a user, comprising:
- a first recommendation appliance comprising
    - means for receiving a web page request from a user and forwarding the web page request to a web server identified in the web page request;
    - means for identifying recommendation context information associated with the received web page request;
    - means for generating a purchase recommendation based on the recommendation context information after the web page request is sent to the web page server;
    - means for receiving a requested web page generated by the web page server in response to the web page request; and
    - means for modifying the requested web page to include the purchase recommendation.

22. The system of claim 21, where the means for generating a purchase recommendation comprises:
- a database for storing a plurality of association rules;
- means for identifying a plurality of candidate recommendation rules from the association rules that match a recommendation context associated with the user;
- means for selecting the purchase recommendation from the plurality of candidate recommendation rules.

23. The system of claim 21, further comprising a second recommendation appliance connected in between the first recommendation appliance and the user, where said second recommendation appliance may be configured to modify a modified requested web page received from the first recommendation appliance.

* * * * *